United States Patent
Farrell

(10) Patent No.: US 6,299,118 B1
(45) Date of Patent: Oct. 9, 2001

(54) PLANT HOLDER

(76) Inventor: Brian P. Farrell, 9130 N. Rexleigh Dr., Bayside, WI (US) 53217

( * ) Notice: Subject to any disclaimer, the term of this patent is extended or adjusted under 35 U.S.C. 154(b) by 0 days.

(21) Appl. No.: 09/507,984

(22) Filed: Feb. 18, 2000

Related U.S. Application Data

(60) Provisional application No. 60/164,588, filed on Nov. 10, 1999.

(51) Int. Cl.⁷ .................................................. A01G 9/02
(52) U.S. Cl. .......................... 248/327; 248/317; 248/323; 248/339; 47/67
(58) Field of Search .................................. 248/317, 318, 248/323, 327, 339, 340; 47/67

(56) References Cited

U.S. PATENT DOCUMENTS

| | | | |
|---|---|---|---|
| D. 224,333 | * 7/1972 | Kelly | D35/3 |
| D. 283,992 | * 5/1986 | Tendrup et al. | D11/148 |
| D. 436,840 | * 1/2001 | Vogt | D8/373 |
| 770,738 | * 9/1904 | Chessman . | |
| 1,154,627 | 9/1915 | Hall . | |
| 1,606,289 | 11/1926 | Bowers . | |
| 1,873,039 | 8/1932 | Robinson et al. . | |
| 1,985,582 | 12/1934 | Schwinger | 240/85 |
| 2,729,411 | 1/1956 | Cahill | 248/59 |
| 3,184,203 | 5/1965 | Steen | 248/318 |
| 3,382,819 | 5/1968 | Deutsch et al. | 108/23 |
| 4,074,882 | * 2/1978 | Anderson | 248/208 |
| 4,220,306 | * 9/1980 | Cueto et al. | 248/328 |
| 4,337,916 | * 7/1982 | Norris | 248/558 |
| 4,622,776 | 11/1986 | Pfaff | 42/67 |
| 4,811,475 | 3/1989 | Morton, Jr. | 29/321 |
| 5,065,971 | * 11/1991 | Gaube | 248/330.1 |
| 5,360,193 | * 11/1994 | Cobb | 248/318 |
| 5,779,210 | 7/1998 | Canson et al. | 248/318 |
| 5,941,019 | 8/1999 | Guarriello, Sr. et al. | 47/66.6 |

* cited by examiner

Primary Examiner—Leslie A. Braun
Assistant Examiner—Steven Marsh
(74) Attorney, Agent, or Firm—Andrus, Sceales, Starke & Sawall, LLP

(57) ABSTRACT

A plant hanger is provided for adjustably supporting an article, such as a potted plant and a plant holder along a vertical axis. The plant hanger includes a first piece having an elongated body provided with a support arrangement spaced therealong, and a hook at one end thereof adapted to be suspended from a support structure. A second piece has a series of flexible rods provided at one end with bent portions adapted to engage and support the plant holder and provided at the other end with a common hook bracket adapted to be engaged with the support arrangement.

6 Claims, 2 Drawing Sheets

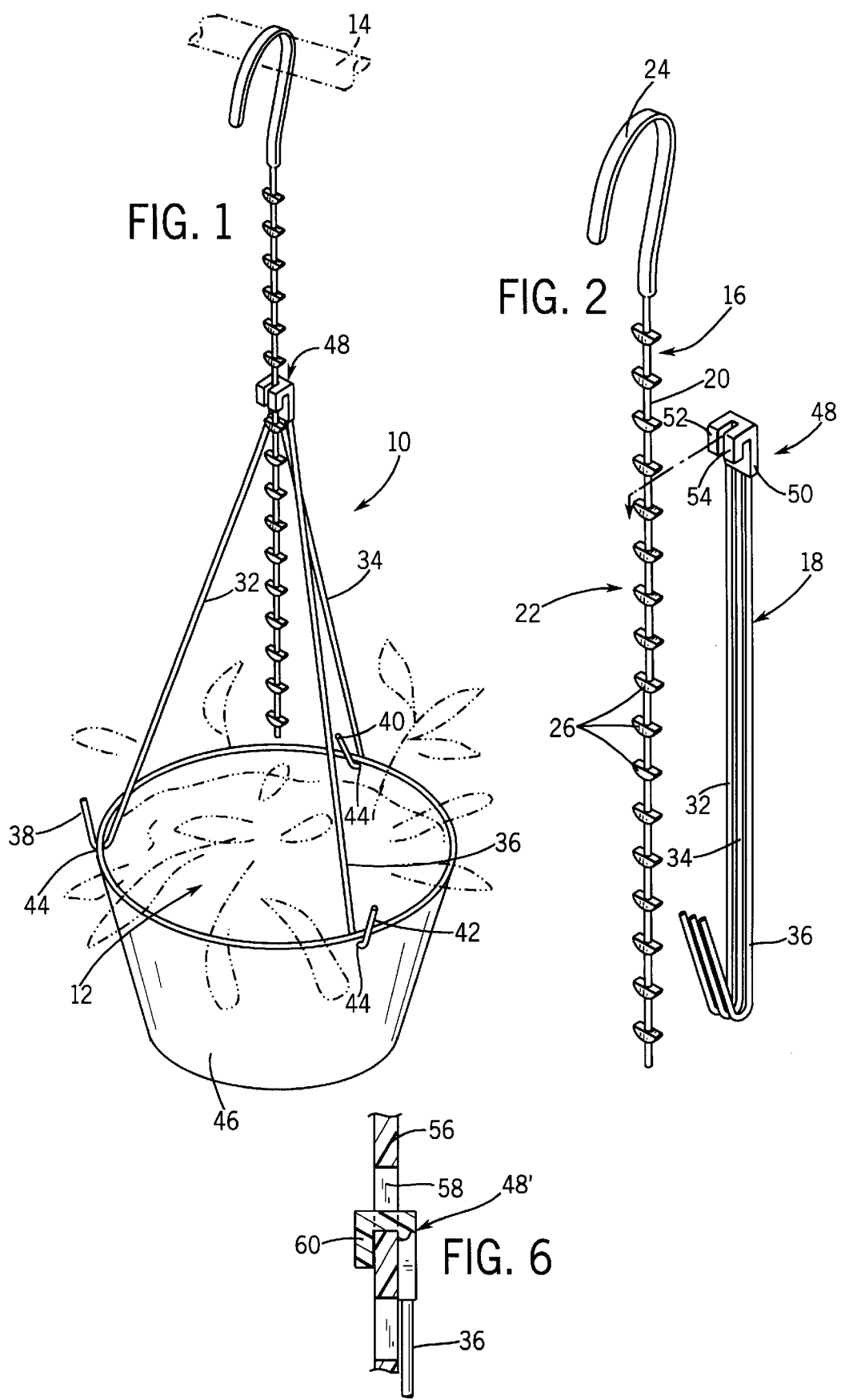

PLANT HOLDER

CROSS-REFERENCE TO RELATED APPLICATIONS

This application is related to Provisional Application U.S. Ser. No. 60/164,588, filed Nov. 10, 1999.

FIELD OF THE INVENTION

This invention relates broadly to improvements in hanger assemblies for articles such as plant holders, flower pots, and the like. More particularly, the invention pertains to an easily assembled and installable suspension system used to adjustably support a plant holder, or the like, along a vertical axis.

BACKGROUND OF THE INVENTION

Hanging plant holders typically employ a non-adjustable set of support stands such as wires, cables, ropes, cords or chains attached to the plant holder at one end of the support strands and to the usual ceiling hook or other support element at the other end of the support strands. Irrigation and maintenance of the contained plants is at times inconvenient, especially if the plant holder is suspended adjacent the ceiling and the ceiling is high.

The height of plant holders has been adjustable, however, by means of various structures. In U.S. Pat. No. 4,669,693, issued Jun. 2, 1986 to Kagan, there is disclosed a plant hanger and a take-up reel for winding up cables supporting the hanger. A lock is provided below the reel to prevent rotational forces from being exerted about the hanger.

In U.S. Pat. No. 4,825,589, issued May 2, 1989 to Straw et al, there is set forth a hanging plant carrier providing a supporting surface on which a potted plant is placed. Below the supporting surface is a spring-powered reel for providing a means of lengthening the support cables extending from an overhead fixed structure.

In U.S. Pat. No. 4,875,653, issued Oct. 24, 1989 to Connolly, an article suspension system is provided for raising, lowering and suspending an article such as a plant on a cord at selected positions of static and dynamic suspension. The system includes an article hook device, locking handle structure and a cord lock for suspension from one or more pulley supports.

In U.S. Pat. No. 4,957,937, issued Sep. 18, 1990 to Haddox, there is shown a hanger adapted for supporting a plant container from a fixed support. The hanger comprises a plurality of flexible straps having upper reaches terminating in upper extremities adapted for connection to the fixed support, and lower reaches terminating in lower extremities adapted for disposition adjacent the plant container. The effective length of each strap is adjustable and dependent on the adjustment of other straps for varying the vertical position of the plant relative to the fixed support.

Despite the attempts of the prior art, there continues to be a need for a simplified, vertically adjustable plant hanger which can be manufactured at a low cost and yet provides adequate support and also is aesthetically pleasing.

SUMMARY OF THE INVENTION

It is one object of the present invention to provide a hanger which is capable of conveniently altering the elevation of a potted plant with respect to a support structure.

It is also an object of the present invention to provide a plant hanger which is capable of suspending plant containers of various sizes.

It is another object of the present invention to provide a suspension system for supporting potted plants and other devices therefrom.

It is another object of the present invention to provide a pair of elongated hanger components which can be quickly and easily employed to change the elevation of a potted plant.

It is still another object of the present invention to provide a plant hanger which is adjustable along a vertical axis without special tools or complex, unsightly adjustments.

It is a further object of the present invention to provide a plant hanger which is economically produced with a minimum of components.

It is an additional object of the present invention to provide a plant hanger which is easy to relocate.

Still another object of the present invention is to provide an improved potted plant assembly for use in indoor and outdoor plant display.

Yet another object of the present invention is to provide a plant hanger which is lightweight and yet extremely strong in suspending potted plants therefrom.

A final object of the present invention is to provide a sleek plant hanger in accordance with the proceeding objects and which will conform to conventional forms of manufacture, be of simple construction, and easy to use so as to provide a device which is economically feasible, long lasting and trouble-free in operation.

In one object of the present invention, a plant hanger is provided for adjustably supporting an article, such as a potted plant, in a plant holder along a vertical axis. The plant hanger includes a first piece having an elongated body provided with a support arrangement spaced therealong, and a hook at one end thereof adapted to be suspended from a support structure. A second piece has a series of flexible rods provided at one end with bent portions adapted to engage and support the plant holder and provided at another end with a common hook bracket adapted to be engaged with the support arrangement.

In the preferred embodiment, the body is a shaft and the support arrangement is defined by a plurality of tangs spaced along the shaft. Each of the tangs has a semi-circular cross section. The hook bracket has an inverted L-shape and includes a pair of spaced fingers, each being supported on one side of a selected tang. In an alternative embodiment, the body is a strip formed with a series of aligned openings. The hook bracket includes a single finger engageable with the wall of any one of the openings.

In another aspect of the invention, a method is provided for adjustably supporting an article such as a potted plant in a plant holder along a vertical axis.

Various other objects, features, and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is perspective of the plant hanger embodying the invention;

FIG. 2 is an exploded, perspective view of the components of the plant hanger in FIG. 1;

FIG. 6 is a sectional view taken on line 6—6 of FIG. 5.

DETAILED DESCRIPTION OF THE INVENTION

Figure 5:
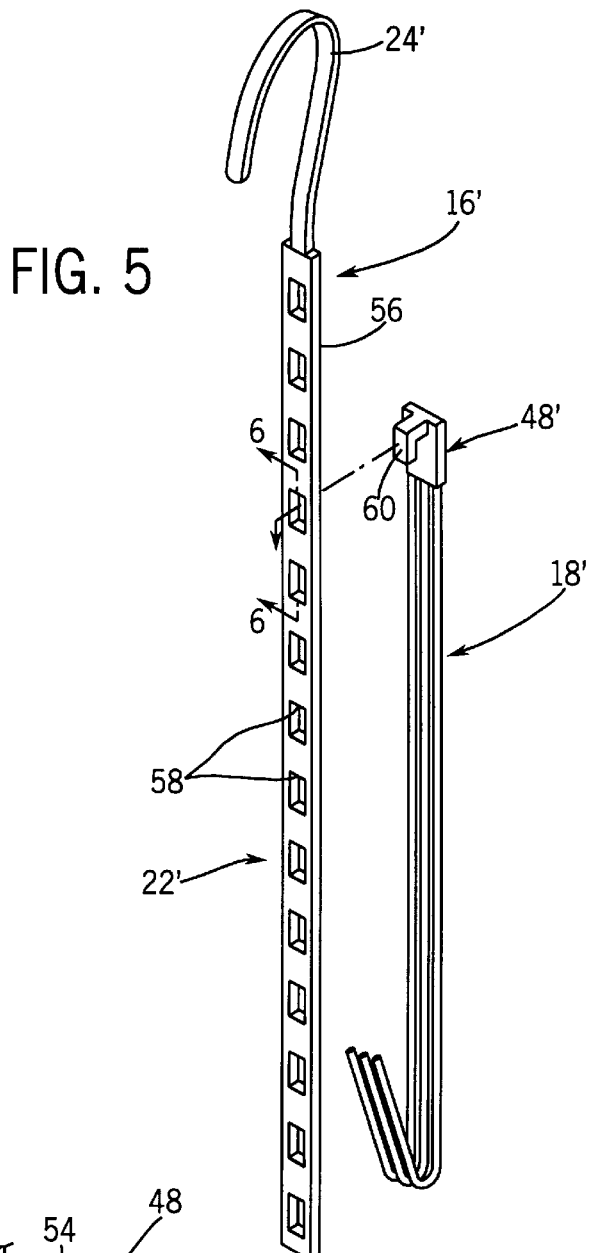
FIG. 5 is an exploded view of an alternative embodiment of the invention.

Referring now to the drawings, there is shown in FIG. 1, a plant hanger 10 for adjustably suspending a potted plant 12 from a support structure 14 which is shown as a rod, but could take the form of a hook or other suitable element. Although the present invention is described in terms of a horizontal or overhead support structure, it should be understood that the support structure could also be a vertical or angulated wall or the like.

Plant hanger 10 is comprised of two support pieces 16, 18 which are engageable together in a suspended relationship. The first piece 16 has an elongated body or shaft 20 provided with a support arrangement 22 spaced therealong, and a downwardly opening hook 24 at an upper end thereof which is adapted to be suspended from the rod 14. In the preferred embodiment, the support arrangement 22 takes the form of a plurality of support tangs 26 spaced apart over substantially the entire length of the shaft 20. Each of the tangs 26 has a semi-circular cross section including upper support surfaces 28, 30 on each side of the shaft 20.

Figure 4:
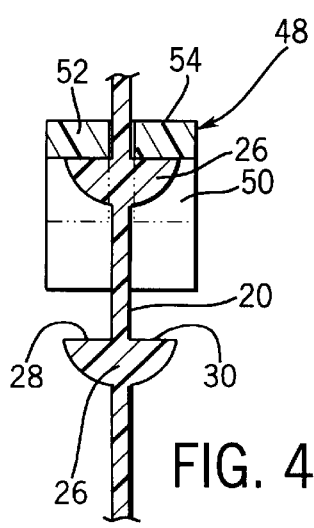
FIG. 4 is a sectional view of the plant hanger taken on line 4—4 of FIG. 3.
Figure 3:
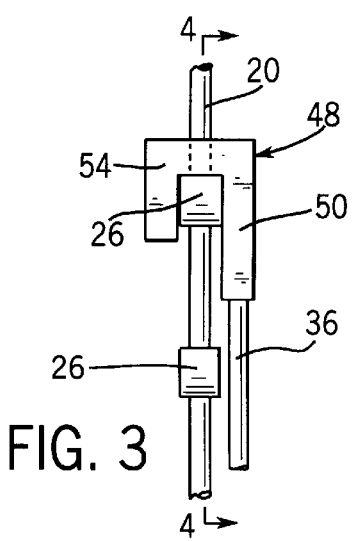
FIG. 3 is a fragmentary side view of the plant hanger shown in FIG. 1.

The second piece 18 includes a series of three flexible, elongated rods 32, 34, 36, provided at their lower ends with portions 38, 40, 42, bent upwardly at an acute angle relative to the remainder of the rods. The distal ends of the bent portions 38, 40, 42, are adapted to be engaged with holes 44 or hooks (not shown) normally provided in the upper rim of a plant holder 46 for containing the potted plant 12 therein. The flexible rods 32, 34, 36, are commonly connected at their upper ends by a common hook bracket 48. In the preferred embodiment, the hook bracket 48 has a rectangular base 50 integrally formed with a pair of spaced apart fingers 52, 54, each of which has an L-shaped cross section. As seen in FIGS. 3 and 4, the fingers 52, 54 are adapted to hang from the upper support surfaces 28, 30 of a selected tang 26, each tang defining a vertical display position relative to the ceiling. Both the first and second pieces 16, 18 of the planter retainer are preferably formed from a plastic material which is lightweight, and strong and durable enough to support various sized potted plants.

The first and second pieces 16, 18 are employed in a method for adjustably supporting an article such as a plant holder 46, along a vertical axis such as defined by the longitudinal axis of the first piece 16. In use, one engages the hook 24 of the first piece 16 with the rod 14 such that the shaft 20 is supported vertically therefrom. Then, one manipulates the flexible rods 32, 34, 36, of the second piece 18, such that the plant holder 46 is engaged with and supported from the bent portions 38, 40, 42. That is, the bent portions are normally inserted into preformed holes 44 or hooks on the rim of the plant holder 46. Finally, the fingers 52, 54 of the hook bracket 48 are engaged over a selected tang 26 so that the plant holder 46 is supportively positioned at a desired height or elevation relative to the support structure.

In an alternative embodiment shown in FIG. 5, the first piece 16' has an elongated body in the form of a strip 56 formed with a series of aligned openings 58 spaced therealong which defines the support arrangement 22'. A hook 24' is again provided in the upper end of the first piece 16'. The second piece 18' is identical to piece 18 except that the hook bracket 48' is formed from a single finger 60 which is engaged with the wall of one of the selected openings 58.

The present invention thus provides a versatile, simplified hanger capable of changing the elevation of an article suspended therefrom. In the preferred embodiment, the hanger is especially attractive in displaying potted plants, but it can be appreciated that the hanger could likewise be used to suspend bird feeders, lanterns, wind chimes, etc. at varying heights. The first and second pieces can be constructed of various lengths and strengths as desired.

Unlike the prior art plant hangers utilizing pulleys and straps, the present invention has an intrinsically simplified construction which is inexpensive to manufacture and extremely easy to install. The present invention allows for conveniently watering and maintaining plants by allowing the potted plants to be quickly relocated to a lower elevation after which they can be repositioned.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. A plant hangar for adjustably supporting an article such as a potted plant in a plant holder along a vertical axis, the hanger comprising:

a first piece having an elongated body provided with a support arrangement spaced therealong and a hook at one end thereof adapted to be supported from a support structure; and a second piece having a series of flexible rods provided at one end with bent portions adapted to engage and support the plant holder, and provided at another end with a hook bracket adapted to be engaged with the support arrangement wherein the elongated body is a strip formed with a series of aligned openings, each having a surrounding wall, and wherein the hook bracket includes a single finger engageable with the wall of any of the openings.

2. The plant hanger of claim 1, wherein the first piece has an elongated body in the form of a shaft.

3. The plant hanger of claim 1, wherein each of the bent portions of the flexible rods is bent upwardly at an acute angle relative to the remainder of the rod.

4. The plant hanger of claim 1, wherein the first piece and the second piece are constructed of plastic material.

5. The plant hangar of claim 1, wherein each opening defines a vertical display position relative to the support structure.

6. A method for adjustably supporting an article such as a plant holder from a support structure along a vertical axis, the method comprising the steps of:

supplying a first piece having an elongated strip body provided with a support arrangement in the form of a series of aligned openings, each having a surrounding wall spaced therealong, and a hook at one end thereof adapted to be supported from the support structure;

supplying a second piece having a series of flexible rods provided at one end with bent portions adapted to engage and support the plant holder, and provided at another end with a hook bracket adapted to be engaged with the support arrangement, the hook bracket being in the form of a single finger engageable with the wall of any of the openings;

engaging the hook of the first piece with the support structure such that the first piece is supported vertically therefrom;

manipulating the flexible rods of the second piece such that the plant holder is engaged with and supported from the bent portions; and engaging the hook bracket with the support arrangement so that the plant holder is supportively positioned at a desired elevation relative to the support structure.

* * * * *